United States Patent Office 3,592,655
Patented July 13, 1971

3,592,655
PHOTOGRAPHIC EMULSIONS AND ELEMENTS COMPRISING A POLYMER OF A DISULFONATE COMPOUND
Thomas K. Dykstra, Rochester, N.Y., assignor to Eastman Kodak Company, Rochester, N.Y.
No Drawing. Filed Mar. 28, 1968, Ser. No. 716,995
Int. Cl. G03c *1/04*
U.S. Cl. 96—114   17 Claims

ABSTRACT OF THE DISCLOSURE

Novel polymerizable disulfoalkyl esters of dicarboxylic acids and polymers thereof and their use in photographic compositions are disclosed.

BACKGROUND OF THE INVENTION

Field of the invention

This invention relates to sulfoalkyl esters of ethylenically unsaturated dicarboxylic acids. In one aspect, this invention relates to the use of new disulfonate-containing polmerizable compounds and film-forming polymers containing said compounds. In another aspect, this invention relates to the use of said novel compounds in photographic silver halide compositions. In still another aspect, this invention relates to photographic elements containing said novel polymers in at least one layer.

Description of the prior art

Hydrophilic colloids such as gelatin, for example, are generally used in the preparation of photographic silver halide emulsions because of their good dispersing properties and their excellent protective colloid properties. However, these colloids such as gelatin are susceptible to dimensional change when subjected to varying temperatures, humidity and like conditions. Various natural and synthetic materials have been proposed as substitutes therefor in one or more layers of a photographic element to provide dimensional stability. Unfortunately, many of these substitute materials "salt-out," i.e. coagulate, in the presence of organic or inorganic salts which are often present in photographic silver halide compositions.

It is also well known to use emulsion polymerization procedures involving monomers obtained from monocarboxylic acid esters to form polmeric gelatin substitutes. However, it has been generally necessary to use emulsifiers in such procedures. Such emulsifiers can be carried over to a photographic emulsion to which the polymeric gelatin-substitutes are added. This often leads to adverse changes in the sensitometric properties of the photographic emulsion.

It is evident, therefore, that a substitute for hydrophilic colloids, such as gelatin and the like, which combines improved dimensional stability with good salt tolerance and which can be prepared by polymerization in the absence of additives such as emulsifying agents, will greatly enhance the art.

SUMMARY OF THE INVENTION

Accordingly, it is an object of this invention to provide new polymerizable disulfoalkyl esters of dicarboxylic acids and polymers thereof which exhibit desirable combinations of physical properties. Another object of this invention is to provide novel and improved photographic compositions. A further object of this invention is to provide novel polymers which can be used in photographic applications and which resist coagulation or salting-out in the presence of inorganic or organic salts.

Another object of this invention is to provide novel compounds and novel polymerization dispersions using said compounds in the absence of emulsifiers, which dispersions find particular utility in photographic applications.

A further object of this invention is to provide photographic elements comprising a photographic silver halide layer and, incorporated in at least one layer of said element, a polymerizable disulfonate of an ethylenically unsaturated dicarboxylic acid ester.

Other objects of this invention will become apparent from an examination of the specification and claims that follow.

DESCRIPTION OF THE PREFERRED EMBODIMENTS

In accordance with this invention, the above objects are attained with a film-forming polymerizable disulfonate having the formula:

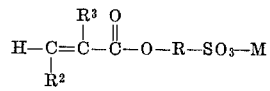

where $R^2$ is hydrogen or

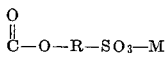

$R^3$ is hydrogen, methyl or

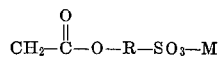

each R is alkylene, generally of up to 12 and preferably of 3–4 carbon atoms; and each M is a salt-forming cation.

The novel polymerizable compounds of this invention form polymers which are excellent substitutes for hydrophilic colloids such as gelatin in photographic applications since they exhibit not only excellent salt tolerance in the form of hydrosols, latices or dispersions but they also exhibit excellent dimensional stability photographic inertness, water insolubility and permeability and can be prepared by polymerization in the absence of emulsifying agents. Further, these polymers exhibit good compatibility with said colloids which makes it possible to replace only a part of the colloid in a photographic composition in order to achieve superior physical properties depending upon the particular combination of properties desired.

These novel compounds, that is, the polymerizable disulfonates, can be derived from the diesterification of polymerizable dibasic carboxylic acids and are generally solid and often contain not more than about 30 carbon atoms and preferably less than 20. Various polymers prepared therefrom such as homopolymers and such as copolymers, and particularly addition polymers possess an unexpected advantage over the polymers prepared from simple monoesters of similar acids, as will be more fully explained and exemplified hereafter.

A significant feature of this invention is that the novel disulfonate-containing polymers of this invention are generally film forming, which makes them suitable hydrophilic colloid substitutes. This property is closely related to the composition of said polymers. For example, the polymers can consist of copolymers which are formed from the polymerization of the disulfonate and one or more compounds having the formula:

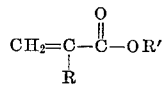

where R is hydrogen or lower alkyl and R' is alkyl. These compounds belong to the group commonly known as ethylenically unsaturated compounds and include, for example, acrylates, and more particularly ethyl acrylate, methyl acrylate, butyl acrylate and substituted acrylates such as ethyl methacrylate, octyl methacrylate and 2-acetoacetoxyethyl methacrylate and the like. When these ethylenically unsaturated compounds are present in the polymer, they generally comprise from about 90% to about 99%, by weight, of the novel copolymer. In one preferred example, the film-forming copolymers can contain a combination of these acrylates including 2-acetoacetoxyethyl methacrylate and an alkyl acrylate such as methyl acrylate in a major proportion and in a minor proportion, for example, about 1 to about 10% by weight consisting of a polymerizable disulfonate having the formula:

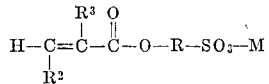

where $R^2$ is hydrogen or

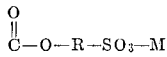

$R^3$ is hydrogen, methyl or

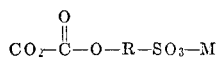

M is an alkali metal cation and R is alkylene of up to about 12 and preferably of 3–4 carbons.

In such a preferred embodiment of this invention, the above-mentioned copolymers contain units of more than two polymerizable compounds and preferably three compounds. Exceptionally good results are obtained in this invention when the polymers comprise disulfoalkyl esters of polymerizable dicarboxylic acids, an acrylic compound having active methylene groups in side chains, and alkyl acrylates. Typical copolymers of this embodiment include poly(2-acetoacetoxyethyl methacrylate-methylacrylate-di-3-sulfopropyl itaconate, disodium salt). The molecular weights of the various polymers employed in photographic emulsions and elements according to the practice of this invention are subject to wide variations, but are often in the range of about 5,000 to about 500,000.

These novel sulfonates described herein can be conveniently obtained in a series of ways, one of which is as the reaction product between suitable sultones and di-salt-forming cations, for example, ammonium, sodium, potassium, lithium and the like, of polymerizable dicarboxylic acids. Suitable sultones include alkane sultones such as these which contain 5- or 6-members like 1,3-propane, 1,4-butane and 2,4-butane sultone, all of which provide the desired product in suitable yield. The dialkali metal salts of the suitable dicarboxylic acids can be formed in aqueous solution. Acids which have been found particularly useful in accordance with my invention are ethylenically unsaturated dicarboxylic acids having a carbon chain of less than 10 and preferably 4 to 5. Acids which have been found particularly useful are maleic, fumaric, itaconic, citraconic and other similar acids. One alternative method for preparing these novel polymerizable disulfonates is to use the cyclic anhydrides of the respective dicarboxylic acids, some of which are listed above.

These disulfoesters can also be prepared using any method known to be suitable for this purpose. For example, certain dicarboxylic acids and hydroxy sulfonic acids in the free form can be interacted or an appropriate diacyl halide and a salt of the hydroxy sulfonic acid can be reacted, and the resulting compounds isolated by conventional procedures.

The disulfonate polymerizations are effected in non-aqueous systems in addition to the already described aqueous systems. For example, where an aqueous system is employed, the disodium salts of the acids are formed by reacting two mole of sodium hydroxide in water. In addition, in those instances where a non-aqueous system is desired, two moles of a substance such as sodium methoxide, for example, are atisfactorily used in an alcohol such as methanol, ethanol, and the like. In this latter procedure, the resulting ester is then easily isolated.

The temperatures at which polymerizable compounds and polymers of this invention are prepared are subject to wide variation since these temperatures depend upon such other variable features as the specific compounds used, the duration of heating, the pressure employed, and like considerations. However, the polymerization temperature generally does not exceed about 200° C., and most often is in the range of about 60° C. to about 100° C. The polymerization can be carried out in suitable solvents or diluents, for example, water or mixtures of water with water-miscible solvents, as exemplified by methanol, ethanol, propanol, isopropyl alcohol, and the like. Atmospheric pressure is normally employed in the polymerization, although either superatmospheric or subatmospheric perssures can be used. The amount of polymerizable monomer used in the polymerization mixture can be varied widely with concentration up to about 10 percent, by weight, and preferably about 4 to about 6 percent by weight based on total weight of monomer in the reaction mixture being satisfactory. Suitable catalysts for the polymerization reaction include, for example, the free radical catalysts, such as hydrogen peroxide, cumene hydroperoxide potassium persulfate, water-soluble azo type initiators and the like. In redox polymerization systems, the usual ingredients can be employed. Where solution polymerization is employed, the resulting polymers can be isolated by precipitation in a non-solvent.

Dispersions of the photographic silver halide in binding agents comprising the polymers of this invention, in combination with hydrophilic colloidal materials such as gelatin, can be made in a variety of ways. For example, an aqueous gelatin dispersion of the photographic silver halide can be mixed with an aqueous dispersion of the polymer. Alternatively, the photographic silver halide can be precipitated in an aqueous dispersion of the polymer of other binding agents, e.g., colloids. In such case, a water-soluble silver salt such as silver nitrate is admixed with a water-soluble halide such as potassium bromide in the presence of the mixture. In still another procedure, the photographic silver halide is precipitated in an aqueous colloid solution such as gelatin and digested in the conventional manner known to the art. After digestion, but prior to coating, there is added to the emulsion an aqueous dispersion of the polymer of this invention. The bulk of the resulting dispersion can be increased by the addition of more of the copolymer of the invention and/or natural or synthetic colloids or binding agents suitable for use in photographic silver halide emulsions. Satisfactory hydrophilic colloids include, for example, gelatin, colloidal albumin, cellulose derivatives, synthetic resins such as polyvinyl compounds and the like. Dispersed polymerized vinyl compounds, particularly those used to improve properties such as dimensional stability in layers of photographic elements can also be added to the binding agent. Preferred polymers of this type are water-insoluble acrylate or methacrylate polymers.

The disulfonate containing polymers of this invention can be employed in one or more layers of a photographic silver halide element. It is desirable that the polymers described herein be combined with colloidal binding agents such as gelatin or other colloids in order to exhibit the very good peptizing action for silver halides. Therefore, photographic silver halide emulsions in which the compounds of this invention are used contain at least some binding agent such as gelatin which exhibits the required peptizing action. Generally, binding agents which comprise about 10 to about 90 percent and most often about 40 to about 60 percent, by weight, of the novel polymers described herein, give good results in photographic silver halide emulsions. In the preferred case, the remainder of the binding agent is a colloid and preferably gelatin, although other colloids also give good results. These novel polymers are used in photographic elements in layers other than the emulsion layers, for example, in filter layers, subbing layers, antihalation layers, antiabrasion layers, antistatic layers and barrier layers, and they can be used as the sole vehicle or in admixture with the natural or synthetic colloids mentioned above. The silver halide employed in the preparation of light-sensitive coatings described herein includes any of the photographic silver halides as exemplified by silver bromide, silver chloride and silver iodide, silver chlorobromide, silver bromoiodide, and the like.

The photographic compositions described herein can be coated on a wide variety of supports. Typical supports are cellulose nitrate film, cellulose acetate film, polyvinyl acetal film, polystyrene film, polyethylene terephthalate film and related films or resinous materials as well as glass, paper, wood and the like. Supports such as paper which are coated with $\alpha$-olefin polymers, particularly polymers of $\alpha$-olefins containing 2–10 carbon atoms as exemplified by polyethylene, polypropylene and ethylene-butene copolymers and the like can also be employed.

The emulsions containing the novel polymers of this invention can be chemically sensitized with compounds of the sulfur group, noble metal salts such as gold salts, reduction sensitized with reducing agents, and combinations of these. Furthermore, emulsion layers and other layers present in photographic elements made according to this invention can be hardened with any suitable hardeners such as aldehyde hardeners, aziridine hardeners, hardeners which are derivatives of dioxane, oxypoly-saccharides such as oxystarch, oxy plant gums, and the like.

The emulsion can also contain additional additives, particularly those known to be beneficial in photographic emulsions, including, for example, stabilizers or antifoggants, particularly the water-soluble inorganic acid salts of cadmium, cobalt, manganese and zinc as disclosed in U.S. Pat. 2,829,404, the substituted triazaindolizines as disclosed in U.S. Pats. 2,444,605 and 2,444,607, speed-increasing materials, plasticizers and the like. Sensitizers which give particularly good results in the photographic compositions disclosed herein are the alkylene oxide polymers which can be employed alone or in combination with other materials, such as quaternary ammonium salts as disclosed in U.S. Pat. 2,886,437 or with mercury compounds and nitrogen-containing compounds as disclosed in U.S. Pat. 2,751,299.

The polymers of this invention can be used in various kinds of photographic emulsions. For example, they can be used in X-ray and other non-spectrally sensitized emulsions as well as orthochromatic, panchromatic and infrared sensitive emulsions, particularly those sensitized with merocyanine dyes, cyanine dyes, carbocyanine dyes and the like. Furthermore, the polymers of this invention can be used in emulsions intended for color photography, for example, emulsions containing color-forming couplers or emulsions to be developed by solutions containing couplers or other color generating materials. In addition, these novel polymers can be used in emulsions intended for use in diffusion transfer processes which utilize the non-developed silver halide in the non-image areas of the negative to form a positive by dissolving the undeveloped silver halide and precipitating it on a receiving layer in close proxmity to the original silver halide emulsion layer. Such processes are described in Rott U.S. Pat. 2,352,014, Land U.S. Pat. 2,543,181 and Yackel et al. U.S. Pat. 3,020,155. The novel polymers described herein can also be used in color transfer processes which utilize the diffusion transfer of an image-wise distribution of developer, coupler or dye from a light-sensitive layer to a second layer while the two layers are in close proximity to one another. Color transfer processes of this type are described in Yutzy U.S. Pat. 2,856,142, Land et al. U.S. Pat. 2,983,606, Whitmore et al. British Pats. 904,364 and 840,731 and Whitmore U.S. Pat. 3,227,552. Silver halide emulsions containing these polymers can be processed in monobath processes such as described in Haist et al. U.S. Pat. 2,875,048 or in stabilization type processes.

This invention can be further illustrated by the following examples of preferred embodiments thereof although it will be understood that these examples are included merely for purposes of illustration and are not intended to limit the scope of the invention unless otherwise specifically indicated.

EXAMPLE 1

As already indicated, a disodium sulfoester of this invention can be prepared in aqueous solution. To illustrate, to a slurry of 65.1 g. (0.5 mole) of itaconic acid in 150 ml. of water is added a solution of 40 g. (1.0 mole) of sodium hydroxide in 60 ml. of water. With vigorous stirring at 60° C., 122.1 g. (1.0 mole) of 1,3-propane sultone is added. Stirring at 60° C. is continued for one hour to give a homogeneous solution containing 53.2 weight percent of di-3-sulfopropyl itaconate, disodium salt.

EXAMPLE 2

An alternative method of producing the disodium esters of this invention in a non-aqueous system is as follows: To a solution of 65.1 g. (0.5 mole) of itaconic acid in 500 ml. of methanol is added with vigorous stirring and within five minutes, a solution of 54 g. (1.0 mole) of sodium methoxide in 600 ml. of methanol. The resulting slurry is refluxed with stirring for 30 minutes. Then 122.1 g. (1.0 mole) of 1,3-propane sultone is added with stirring in five minutes. Stirring is continued at reflux temperature for 3½ hours during which time a solution is formed. Methanol is distilled from the flask until a precipitate begins to form. Two liters of diethyl ether is added to the mixture and the resulting solid is collected and dried. There is obtained 204.2 g. of di-3-sulfopropyl itaconate, disodium salt which is 98% of the theoretical amount.

EXAMPLE 3

Homopolymerization of the di-3-sulfopropyl itaconate, disodium salt, is accomplished by preparing, under nitrogen, a solution of 15 g. of the aqueous solution of Example 1, 0.03 g. of potassium persulfate and 15 ml. of water. The mixture is heated at 60° C. for about 18 hours. The slightly viscous solution is poured into acetone to give a white solid which is dried in a vacuum oven. This polymer is hygroscopic and turns into a viscous oil in air.

EXAMPLE 4

The novel compounds of this invention can be copolymerized with other ethylenically unsaturated monomers such as the acrylates. To illustrate, copolymerization is accomplished as described hereafter to form copoly-(methyl acrylate-di-3-sulfopropyl itaconate, disodium salt). In a flask 375 ml. of distilled water is purged of air at 98° C. with bubbling nitrogen. To the water is added 4 ml. of Triton 770 (40%) (Triton 770 is a surfactant composition of a sodium alkyl aryl polyether sulfate and isopropanol, manufactured by Rohm and Haas Co.), 1.0 g. of potassium persulfate, and 0.1 g. of sodium bisulfite. Simultaneously, the following additions are effected with vigorous stirring over about eleven minutes. (A) 118.7 g. of methyl acrylate and (B) 13 g. of 53.2% of solution obtained as described in Example 1, 0.23 g. of sodium bisulfite and 4 ml. of Triton 770 (40%) in 118 ml. of deoxygenated water. After these additions, the latex is stirred at 98° C. for one hour, after which time, trace amounts of sodium bisulfite are added at 5-minute intervals until a negative test for potassium persulfate is obtained. The latex is chilled to room temperature and filtered through glass wool. The latext is stable to the addition of 3 M cadmium chloride solution at pH 2.9. This pH is raised to 5.0 with 2.5% aqueous sodium hydroxide. A solids determination indicates 19.5% solids and yields a tough, transparent, flexible, non-tacky film.

EXAMPLE 5

In order to demonstrate the prepartion of a latex copolymer without an emulsifier, the same procedure as in Example 4 is followed and the Triton 770 (40%) is deleted. The properties of this copolymers are identical to those prepared with an emulsifier (Example 4).

EXAMPLE 6

The procedure of Example 4 is repeated using 111 g. of methyl acrylate, 5.9 g. of di-3-sulfopropyl itaconate, disodium salt, and 8.1 g. of 2-acetoacetoxyethyl methacrylate. These are converted to a latex copolymer having identical properties observed and described in Example 4.

EXAMPLE 7

The latexes obtained in the practice of this invention are highly resistant to coagulation in the presence of polyvalent metal salts such as sodium chloride and calcium chloride, and amine salts such as triethyl amine hydrochloride salts. To illustrate, a 10% aqueous solution of zinc acetate, cadmium chloride, barium chloride, magnesium sulfate, calcium chloride, or sodium chloride is added to the addition polymer latex obtained in Example 6 and no precipitation occurs.

In contrast thereto, a polymer prepared from methyl acrylate in the absence of the disulfoalkyl ester monomers immediately precipitates upon exposure to these solutions. Thus, the aforementioned salt solutions all immediately precipitate an aqueous dispersion of a copolymer of methyl acrylate with acrylic acid (95:5 by weight).

EXAMPPLE 8

To a slurry of 58 g. (0.5 mole) of fumaric acid in 100 ml. of water is added, with vigorous stirring at room temperature, a solution of 40 g. (1.0 mole) of sodium hydroxide in 100 ml. of water. The resulting slurry is stirred on the steam bath for one-half hour. Then, 122.1 g. (1.0 mole) of 1,3-propane sultone is added. Stirring on the steam bath is continued for one hour during which time the reaction mixture clears to a water white solution. This 50% solution of monomer, di-3-sulfopropyl fumarate, disodium salt, in water can be used immediately in polymerization procedures without isolation of the monomer.

EXAMPLE 9

In a manner identical to that described in Example 4, 111 g. of methyl acrylate, 5.9 g. of di-3-sulfopropyl fumarate, disodium salt and 8.1 g. of 2-acetoacetoxyethyl methacrylate are converted to a latex polymer with properties similar to those described in Example 4. This latex of copoly(2-acetoacetoxyethyl methacrylate-di-3-sulfopropyl fumarate, disodium salt-methyl acrylate) is not stable to 3 molar cadmium chloride solution at pH 2.5 but is stable to this salt solution at pH 6.5.

EXAMPLE 10

A fine grain silver chlorobromoiodide emulsion of the lith type comprising about 140 g. per mole of silver of a vehicle of gelatin and copoly(methyl acrylate-di-3-sulfopropyl itaconate, disodium salt) (about 95:5 weight percent) in proportion by weight of gelatin to polymer, of from about 40:60 to about 50:50 weight percent, is coated on 4 mil poly(ethylene terephthalate) film support at a coverage of 540 mg. of total vehicle per square foot. The film support is coated on the reverse side with a pelloid layer of the same emulsion vehicle at the same coverage. It is seen that the dimentional stability of the resulting element is improved since the percent dimensional change per 1% change in relative humidity is decreased about 20% to 70% depending upon the ratio of gelatin to copolymer employed. In addition, the gelatin-copolymer coatings have a low tackiness and are clear and flexible. A latex of the copolymer is resistant to bivalent metal salt solutions as demonstrated by the absence of coagulation upon the addition of such solutions.

EXAMPLE 11

Similar good results are shown when the copoly(methylacrylate-di-3-sulfopropyl itaconate, disodium salt) is replaced, for example, with copoly(2 - acetoacetoxyethyl methacrylate-methylacrylate-di-3-sulfopropyl itaconate, disodium salt) or copoly(2-acetoacetoxyethyl methacrylate-di-3-sulfopropyl fumarate, disodium salt-methyl acrylate) and other methacrylate polymers.

For example, to separate portions of a fine grain silver chlorobromide emulsion as shown in Example 10 containing 70 g. of gelatin per mole of silver is added the following:

(1) Poly(2-acetoacetoxyethyl methacrylate methyl acrylate-di-3-sulfopropyl itaconate, disodium salt)
(2) Poly(2-acetoacetoxyethyl methacrylate-di-3-sulfopropyl fumarate, disodium salt-methyl acrylate)
(3) Poly(methyl acrylate-sulfopropyl acrylate)
(4) Poly(methyl acrylate-sulfopropyl acrylate-2-acetoacetoxyethyl methacrylate).

These polymers are each added in separate portions in an amount sufficient to give 70 g. per polymer mole of silver. These portions are then coated as the control, at 416 mg. Ag/ft.$^2$, 270 mg. polymer/ft.$^2$ and 270 mg. gelatin/ft.$^2$ or 540 mg. of total vehicle/ft.$^2$.

A pelloid layer with the same vehicle as that used in the emulsion is coated on the under side of the film support at the same coverage.

The coatings are exposed on an Eastman 1B Sensitometer developed for 4 minutes in Kodak D–11 developer, fixed, washed, and dried. The following tabulated results show that dimensional stability determinations are greatly improved since the percent dimensional stability changes per 1% change in humidity is decreased substantially. As observed in Example 10, gelatin-polymer coatings are substantially free of tack and are clear and flexible. Similarly, the polymer latexes resist coagulation when exposed to bivalent metal salt solutions.

| Vehicle, g./Ag mole | Sensitometric tests | | | Dimensional change/10% change in relative humidity |
|---|---|---|---|---|
| | Rel. speed | Gamma | Fog | |
| Gelatin (140) | 100 | 3.94 | .01 | 0.0028 |
| Gelatin (70) plus Polymer 3 (70) | 107 | 3.90 | .01 | 0.0015 |
| Gelatin (70) plus Polymer 4 (70) | 97 | 3.60 | .01 | 0.0014 |
| Gelatin (70) plus Polymer 1 (70) | 102 | 3.65 | .01 | 0.0017 |
| Gelatin (70) plus Polymer 2 (70) | 107 | 3.76 | .01 | 0.0016 |

The invention has been described in considerable detail with reference to certain preferred embodiments thereof but it will be understood that variations and modifications can be effected which are consistent therewith without departing from the spirit and scope of the invention as described hereinabove and in the appended claims.

I claim:
1. A photographic silver halide emulsion comprising silver halide, a binding agent comprising a hydrophilic colloid and a copolymer of at least one other polymerizable ethylenically unsaturated compound and a polymerizable disulfonate having the formula:

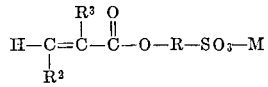

where $R^2$ is hydrogen or

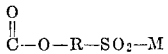

$R^3$ is hydrogen, methyl or

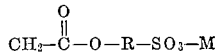

each R is alkylene; and each M is a salt-forming cation.

2. A silver halide emulsion of claim 1 wherein said binding agent comprises up to about 70%, by weight, of said copolymer and said copolymer is a copolymer of about 90% to about 99%, by weight, of at least one alkyl acrylate and about 1 to about 10%, by weight, of a compound of said polymerizable disulfonate.

3. A photographic element having a gelatino silver halide layer containing up to 70%, by weight, of a polymer of a polymerizable disulfonate having the formula:

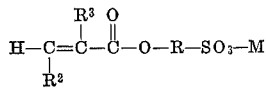

where $R^2$ is hydrogen or

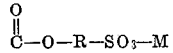

$R^3$ is hydrogen, methyl or

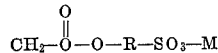

each R is alkylene; and each M is a salt-forming cation.

4. A photographic element comprising a support, at least one photographic silver halide layer with at least one layer having a binding agent comprising a film-forming polymer of a polymerizable disulfonate compound having the formula:

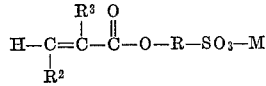

wherein $R^2$ is hydrogen or

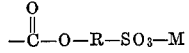

$R^3$ is hydrogen, methyl or

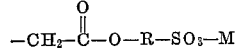

each R is alkylene; and each M is a salt-forming cation.

5. An element according to claim 4 wherein the said binding agent is contained in the photographic silver halide layer.

6. The photographic silver halide emulsion according to claim 1 wherein the polymer is copoly(methyl acrylate-di-3-sulfopropyl itaconate).

7. The photographic silver halide emulsion according to claim 6 wherein the said polymer is in the form of the disodium salt.

8. The photographic silver halide emulsion according to claim 1 wherein the polymer is copoly(2-acetoacetoxy ethyl methacrylate-methyl acrylate-di-3-sulfopropyl itaconate).

9. The photographic silver halide emulsion according to claim 8 wherein the said polymer is in the form of the disodium salt.

10. The photographic silver halide emulsion according to claim 1 wherein the polymer is poly(di-3-sulfopropyl itaconate).

11. The photographic silver halide emulsion according to claim 10 wherein the said polymer is in the form of the disodium salt.

12. The photographic element according to claim 4 wherein the polymer is copoly(methyl acrylate-di-3-sulfopropyl itaconate).

13. The photographic element according to claim 12 wherein the said polymer is in the form of the disodium salt.

14. The photographic element according to claim 4 wherein the polymer is copoly(2-acetoacetoxy ethyl methacrylate-methyl acrylate-di-3-sulfopropyl itaconate).

15. The photographic element according to claim 14 wherein the said polymer is in the form of the disodium salt.

16. The photographic element according to claim 4 wherein the polymer is poly(di-3-sulfopropyl itaconate).

17. The photographic element according to claim 16 wherein the said polymer is in the form of the disodium salt.

References Cited

UNITED STATES PATENTS

| | | | |
|---|---|---|---|
| 3,147,301 | 9/1964 | Sheetz | 260—79.3 |
| 3,241,969 | 3/1966 | Hart et al. | 96—114X |
| 3,411,911 | 11/1968 | Dykstra | 96—114X |
| 3,459,790 | 8/1969 | Smith | 96—114X |

RONALD H. SMITH, Primary Examiner

U.S. Cl. X.R.

117—161UC, 161UB; 260—79.3M